(12) United States Patent
Kato et al.

(10) Patent No.: US 10,145,409 B2
(45) Date of Patent: Dec. 4, 2018

(54) BEARING APPARATUS OF CRANKSHAFT FOR INTERNAL COMBUSTION ENGINE

(71) Applicant: Daido Metal Company Ltd., Naka-ku, Nagoya (JP)

(72) Inventors: Kenta Kato, Inuyama (JP); Osamu Ishigo, Inuyama (JP); Yasushi Saito, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 17 days.

(21) Appl. No.: 15/358,593

(22) Filed: Nov. 22, 2016

(65) Prior Publication Data

US 2017/0152885 A1 Jun. 1, 2017

(30) Foreign Application Priority Data

Nov. 27, 2015 (JP) .................................. 2015-231785

(51) Int. Cl.
*F01M 1/02* (2006.01)
*F16C 3/14* (2006.01)
(Continued)

(52) U.S. Cl.
CPC .................. *F16C 3/14* (2013.01); *F01M 1/06* (2013.01); *F01M 11/02* (2013.01); *F16C 9/02* (2013.01);
(Continued)

(58) Field of Classification Search
CPC combination set(s) only.
See application file for complete search history.

(56) References Cited

U.S. PATENT DOCUMENTS 4,023,547 A * 5/1977 Reisacher ................ F01M 1/06
123/195 R
4,928,550 A * 5/1990 Sakai ........................ F16C 3/14
74/595

(Continued)

FOREIGN PATENT DOCUMENTS

EP 2660485 A1 11/2013
JP 08-277831 10/1996
(Continued)

OTHER PUBLICATIONS

Extended European Search Report dated Apr. 26, 2017 in corresponding EP Application No. 16199017.1.

*Primary Examiner* — Lindsay Low
*Assistant Examiner* — Ruben Picon-Feliciano
(74) *Attorney, Agent, or Firm* — Snyder, Clark, Lesch & Chung, LLP

(57) ABSTRACT

There is provided a bearing apparatus of a crankshaft for an internal combustion engine. The bearing apparatus includes a crankshaft having a plurality of journal portions and a plurality of crank pin portions; a main bearing supporting the crankshaft; and a bearing housing holding the main bearing. The plurality of journal portions include a first journal portion having a lubricating oil passage and a second journal portion not having the lubricating oil passage. The first and second journal portions and are supported by the first and second main bearings and. The bearing housing includes an Al alloy upper housing and an Fe alloy lower housing. The groove depth of the oil groove of the upper half bearing of the second main bearing is one half or less than the groove depth of the oil groove of the upper half bearing of the first main bearing.

7 Claims, 11 Drawing Sheets

(51) Int. Cl.
  *F01M 11/02*  (2006.01)
  *F16C 9/02*  (2006.01)
  *F01M 1/06*  (2006.01)
  F16C 33/04  (2006.01)
  F16C 33/10  (2006.01)

(52) U.S. Cl.
  CPC . *F01M 2001/062* (2013.01); *F01M 2011/026* (2013.01); *F16C 33/046* (2013.01); *F16C 33/1065* (2013.01)

(56) References Cited

U.S. PATENT DOCUMENTS

| | | | | |
|---|---|---|---|---|
| 5,138,991 | A | * | 8/1992 | Wojdyla .................. F01M 1/06 123/196 R |
| 5,146,879 | A | * | 9/1992 | Kume ..................... F01M 1/06 123/48 B |
| 6,244,237 | B1 | * | 6/2001 | Sayama .................. F02B 75/22 123/192.2 |
| 6,491,438 | B1 | * | 12/2002 | Ono .......................... F16C 9/02 384/288 |
| 2005/0076858 | A1 | * | 4/2005 | Beardmore ............. F01M 1/06 123/41.38 |
| 2016/0305363 | A1 | * | 10/2016 | Leone ...................... F02F 1/18 |

FOREIGN PATENT DOCUMENTS

| | | |
|---|---|---|
| JP | WO 2004/038188 | 5/2004 |
| JP | 2006-125565 | 5/2006 |

* cited by examiner

BEARING APPARATUS OF CRANKSHAFT FOR INTERNAL COMBUSTION ENGINE

INCORPORATION BY REFERENCE

The present application claims priority from JP Patent Application Ser. No. 2015-231785 filed on Nov. 27, 2015, the content of which is hereby incorporated by reference into this application.

BACKGROUND OF THE INVENTION

The present invention relates to a bearing apparatus of a crankshaft for an internal combustion engine.

The crankshaft of a multi-cylinder internal combustion engine includes a plurality of journal portions and a plurality of crank pin portions. The plurality of journal portions includes a journal portion A (hereinafter referred to simply as "a journal portion A") having a lubricating oil passage for supplying oil to the crank pin portions and a journal portion B (hereinafter referred to simply as "a journal portion B") not having the lubricating oil passage. The crankshaft is supported in a lower part of a cylinder block of the internal combustion engine via a main bearing A in the journal portion A and via a main bearing B in the journal portion B. The main bearings A and B are formed into a cylindrical shape by assembling a pair of half bearings into a bearing holding hole of a bearing housing. The bearing housing includes an upper housing constituting a part of the cylinder block and a lower housing serving as a bearing cap. In order to lubricate the main bearings A and B, oil pumped by an oil pump is supplied into an oil groove formed along an inner peripheral surface of the main bearings A and B through an oil gallery formed in a wall of the cylinder block and through-holes formed in the walls of the main bearings A and B. The journal portion A includes a first lubricating oil passage formed through in a diameter direction of the journal portion A and the end openings thereof communicate with the oil groove of the main bearing A. Further, a second lubricating oil passage is formed branched from the first lubricating oil passage so as to pass through a crank arm portion and communicates with a third lubricating oil passage formed through in the diameter direction of the crank pin portion. Therefore, the oil supplied into the oil groove of the main bearing A passes through the first lubricating oil passage, the second lubricating oil passage, and the third lubricating oil passage, and then is supplied into a sliding surface between the crank pin portion and a connecting rod bearing from an end opening of the third lubricating oil passage (oil outlet formed in an outer peripheral surface of the crank pin portion).

The main bearing A and the main bearing B having the same shape are used. The oil groove is formed in an at least one of the inner peripheral surfaces of the pair of half bearings constituting the main bearing, and the oil groove is formed throughout the entire length in the circumferential direction of the half bearing (FIG. 1 in JP-A-08-277831). In this case, an amount of oil exceeding the amount necessary for lubricating the inner peripheral surface of the main bearing B is supplied.

Regarding the main bearing B, there is proposed a bearing apparatus which does not use an oil groove of the half bearing BU on the cylinder block side, but uses an oil hole formed through the inner peripheral surface and the outer peripheral surface of the half bearing BU, and causes oil externally supplied through the oil hole to flow into a clearance between the inner peripheral surface of the main bearing B and the surface of the journal portion B, thereby to reduce the amount of oil supplied to the main bearing B (WO-A-2004038188). Further, in the main bearing A of this bearing apparatus, the circumferential end portions of the oil groove formed along the circumferential direction of the inner peripheral surface of one half bearing AU do not communicate with a crash relief formed at the circumferential end portions of the inner peripheral surface of the half bearing AU. Thus, the partial structure of the oil groove of the half bearing AU suppresses oil in the oil groove from flowing outside of the main bearing A through a clearance caused by the crash relief. According to the bearing apparatus in WO-A-2004038188, the amount of oil supplied to the plurality of main bearings A and B of the bearing apparatus can be reduced, which can accordingly reduce the size of the oil pump and can reduce the fuel consumption of the internal combustion engine.

JP-A-2006-125565 has an object to overcome a drawback of the bearing apparatus (disclosed in FIG. 5) of WO-A-2004038188 that the main bearing B suffers from insufficient cooling and reduced durability. According to the bearing apparatus of JP-A-2006-125565, a partial oil groove is formed in the inner peripheral surface of one half bearing BU of the main bearing B, and this oil groove extends in the circumferential direction of the inner peripheral surface including the circumferential center position of the half bearing BU up to a little before the circumferential end portions (paragraph [0009]). This can increase the amount of oil supplied to the inner peripheral surface of the main bearing B, and thus can prevent reduction in durability of the main bearing B. Note that according to the main bearing A of the bearing apparatus of JP-A-2006-125565, the oil groove is formed throughout the entire length of the inner peripheral surface of one half bearing AU. The bearing apparatus of JP-A-2006-125565 increases the amount of oil supplied to the main bearing B, and thus requires an increase in size of the oil pump. The oil pump is operated by the rotating force of the crankshaft, and thus the increased size of the oil pump increases mechanical loss of the internal combustion engine.

Further, recent years have seen a tendency that an Al alloy is employed in the cylinder block to reduce the weight of the internal combustion engine for a passenger car. The bearing housing of the main bearing includes an Al alloy upper housing constituting a part of the cylinder block and an Fe alloy lower housing serving as the bearing cap. This bearing housing used for the bearing apparatus of JP-A-2006-125565 has a problem in that when the internal combustion engine is started (particularly when the internal combustion engine is started in a cold area where the bearing apparatus is in a low temperature state), oil is unlikely to be supplied into the sliding surface of the half bearing BL without an oil groove incorporated into the Fe alloy bearing cap side, thereby causing thermal seizure in the inner peripheral surface of the half bearing BL.

A bearing clearance for supplying oil is provided between the inner peripheral surface of the main bearing and the surface of the journal portion of the crankshaft. If this bearing clearance is too large, backlash is produced in the crankshaft, causing vibration and noise of the internal combustion engine. When the bearing housing includes the Al alloy upper housing and the Fe alloy lower housing, the bearing clearance is changed by a change in temperature due to a different thermal expansion coefficient of the journal portion between the Al alloy housing and the Fe alloy crankshaft. The bearing apparatus of the internal combustion engine for a passenger car is configured such that the bearing clearance is narrowed at a temperature (for example 120° C.) of the bearing housing during regular operation for quietness of the internal combustion engine. More specifically, the bearing clearance is changed such that the lower the temperature of the bearing housing, the bearing clearance is further narrower. The internal combustion engine for a passenger car is started in a cold area where the bearing housing is in a low temperature state (for example, about −30° C.). Thus, the difference in thermal expansion coefficient between the Al alloy housing and the Fe alloy crankshaft causes the bearing clearance to be extremely narrowed and further the oil viscosity is in a high state.

According to the bearing apparatus of JP-A-2006-125565, oil in the partial oil groove provided in the inner peripheral surface of the half bearing BU assembled into the Al alloy upper housing is in a high viscosity state, and further the bearing clearance between the inner peripheral surface of the half bearing BU and the surface of the journal portion is extremely narrow, and thus the oil is unlikely to flow from within the oil groove to outside. Therefore, the oil is not promptly supplied to the inner peripheral surface of the other half bearing BL assembled into the Fe alloy lower housing. For this reason, the inner peripheral surface of the other half bearing BL is damaged.

SUMMARY OF THE INVENTION

Technical Problem

In view of this, it is an object of the present invention to provide a bearing apparatus of a crankshaft for an internal combustion engine allowing oil to be promptly supplied to a bearing clearance when the internal combustion engine is started in a low temperature state and capable of minimizing the amount of oil supplied during regular operation.

Solution to Problem

In order to solve the above problem, the present invention provides a bearing apparatus (1) of a crankshaft for an internal combustion engine, the bearing apparatus comprising: a crankshaft (3) including a plurality of journal portions (61, 62) and a plurality of crank pin portions (5); main bearings (41, 42) supporting the crankshaft (3); and a bearing housing (8) holding the main bearings (41, 42), wherein the plurality of journal portions includes a first journal portion (61) having a lubricating oil passage (63a) for supplying oil to the crank pin portions of the crankshaft and a second journal portion (62) not having the lubricating oil passage, the first journal portion (61) is supported by a first main bearing (41); and the first main bearing (41) includes a pair of semi-cylindrical shaped upper half bearing (41U) and a lower half bearing (41L), the second journal portion (62) is supported by a second main bearing (42); and the second main bearing (42) includes a pair of semi-cylindrical shaped upper half bearing (42U) and a lower half bearing (42L), the bearing housing (8) includes an Al alloy upper housing (81) and an Fe alloy lower housing (82); the upper housing has a semi-cylindrical surface (83a) aligned with an outer peripheral surface of the upper half bearing; the lower housing has a semi-cylindrical surface (83b) aligned with an outer peripheral surface of the lower half bearing; the upper half bearings (41U, 42U) are held by the semi-cylindrical surface (83a) of the upper housing; and the lower half bearings (41L, 42L) are held by the semi-cylindrical surface (83b) of the lower housing, an internal oil passage (G2) for supplying oil to the first and second main bearings is formed inside the upper housing; and an opening (G2c) of the internal oil passage (G2) is formed in the semi-cylindrical surface (83a) of the upper housing, only the upper half bearings (41U, 42U) of the pairs of half bearings have oil grooves (41G, 42G) formed in the inner peripheral surface and at least one oil hole (45), the oil hole (45) penetrates bearing wall thickness of the upper half bearings (41U, 42U) and opens in the outer peripheral surface, the opening (G2c) of the internal oil passage (G2) of the upper housing (81) communicates with the oil grooves (41G, 42G) through the oil hole (45), the upper and lower half bearings (41U, 41L, 42U, 42L) includes crash reliefs (70) at circumferential end portions of inner peripheral surfaces thereof, a range where the oil groove (41G) of the upper half bearing (41U) of the first main bearing (41) is formed in the circumferential direction is a range where each of the circumferential end portions of the oil groove (41G) communicates with the crash relief (70) at a minimum distance and opens in a circumferential end face (72) of the upper half bearing (41U) at a maximum distance, a range (θ1) where the oil groove (42G) of the upper half bearing (42U) of the second main bearing (42) is formed in the circumferential direction is a range of a circumferential angle of ±45° with respect to a circumferential center portion of the upper half bearing (42U) at a maximum distance, and a range of at least a circumferential angle 10° in a region of a circumferential angle of ±45° with respect to the circumferential center portion of the upper half bearing (42U), and a groove depth (D2) of the oil groove (42G) of the upper half bearing (42U) of the second main bearing (42) is one half or less than a groove depth (D1) of the oil groove (41G) of the upper half bearing (41U) of the first main bearing (41).

It should be noted that the terms "upper" and "lower" are not intended to limit the arrangement of the configuration of the present invention, but the present invention can be arranged in any orientation.

According to another embodiment of the present invention, the groove depth (D2) of the oil groove (42G) of the upper half bearing (42U) of the second main bearing (42) is up to 0.5 mm.

According to still another embodiment of the present invention, the groove depth (D2) of the oil groove (42G) of the upper half bearing (42U) of the second main bearing (42) is maximum at a center portion of a circumferential length of the oil groove (42G) and becomes smaller toward the circumferential end portions.

According to yet another embodiment of the present invention, the at least one oil hole (45) of the upper half bearing (42U) of the second main bearing (42) is located at a center portion of a circumferential length of the oil groove (42G).

According to yet another embodiment of the present invention, the at least one oil hole (45) of the upper half bearing (42U) of the second main bearing (42) is located closer to a rear side in a rotation direction of the second journal portion (62) than the center portion of the circumferential length of the oil groove (42G).

According to yet another embodiment of the present invention, the at least one oil hole (45) of the upper half bearing (42U) of the second main bearing (42) is located at an end portion on a rear side in a rotation direction of the second journal portion (62) of the oil groove (42G).

Advantageous of the Invention

According to the present invention, when the temperature of the bearing apparatus 1 (bearing housing 8) is changed, the oil groove 42G of the upper half bearing 42U of the second main bearing 42 supporting the second journal portion 62 is formed in a region having a large change in clearance between a groove bottom surface of the oil groove 42G and the surface of the second journal portion 62, and the groove depth D2 of the oil groove 42G of the upper half bearing 42U is one half or less than the groove depth D1 of the oil groove 41G of the upper half bearing 41U of the first main bearing 41 supporting the first journal portion 61. For this reason, when the internal combustion engine is started in a cold area in a low temperature state (for example, about −30° C.), the clearance between the groove bottom surface of the oil groove 42G of the upper half bearing 42U supporting the second journal portion 62 and the surface of the second journal portion 62 is narrowed. Then, all the oil inside the oil groove 42G strongly influenced by the force from the surface of the rotating journal portion 62 to be forcibly supplied toward the front side in the axial rotation direction inside the oil groove 42G. During this time, the oil is sheared, the temperature rises promptly, and the viscosity decreases.

When the internal combustion engine is started in a low temperature state, the bearing clearance between the surface of the second journal portion 62 and the inner peripheral surface 71 of the second main bearing 42 is extremely narrow, and oil with low viscosity flows from within the oil groove 42G into the narrow bearing clearance. Then, oil is promptly supplied to the bearing clearance between the inner peripheral surface 71 of the lower half bearing 42L housed in the Fe alloy lower housing 82 and the surface of the second journal portion 62.

On the contrary, an increase in temperature of the bearing apparatus 1 during regular operation of the internal combustion engine increases the clearance between the groove bottom surface of the oil groove 42G of the upper half bearing 42U and the surface of the second journal portion 62, and the force of the rotating journal portion is unlikely to act on the oil inside the oil groove. Further, the circumferential end portions of the oil groove 42G are located in the inner peripheral surface 71 of the upper half bearing 42U and are closed. Thus, oil is unlikely to flow excessively from the circumferential end portions of the oil groove 42G into the clearance between the inner peripheral surface of the upper half bearing 42U and the surface of the second journal portion 62. In addition, the circumferential formation range of the oil groove 42G of the upper half bearing 42U is narrow, and the groove depth of the oil groove 42G is one half or less than the groove depth of the oil groove 41G of the upper half bearing 41U of the first main bearing 41. The above structure reduces the internal volume of the oil groove 42G. A reduction in the amount of oil to be supplied to the second main bearing 42 can reduce the size of the oil pump.

DESCRIPTION OF THE INVENTION

First Embodiment

Figure 1:
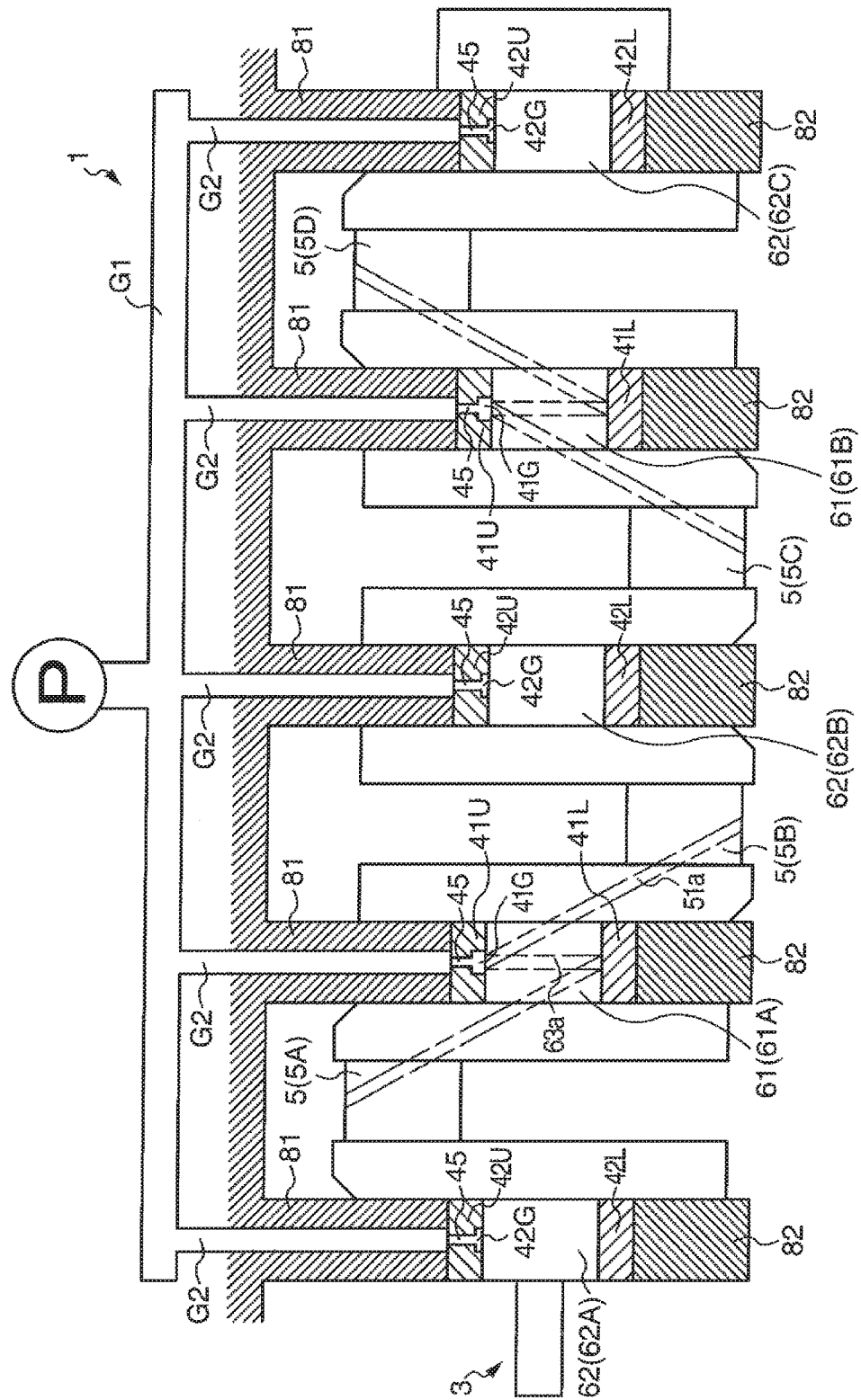
FIG. 1 is a schematic view illustrating a bearing apparatus of a crankshaft.
Figure 2:
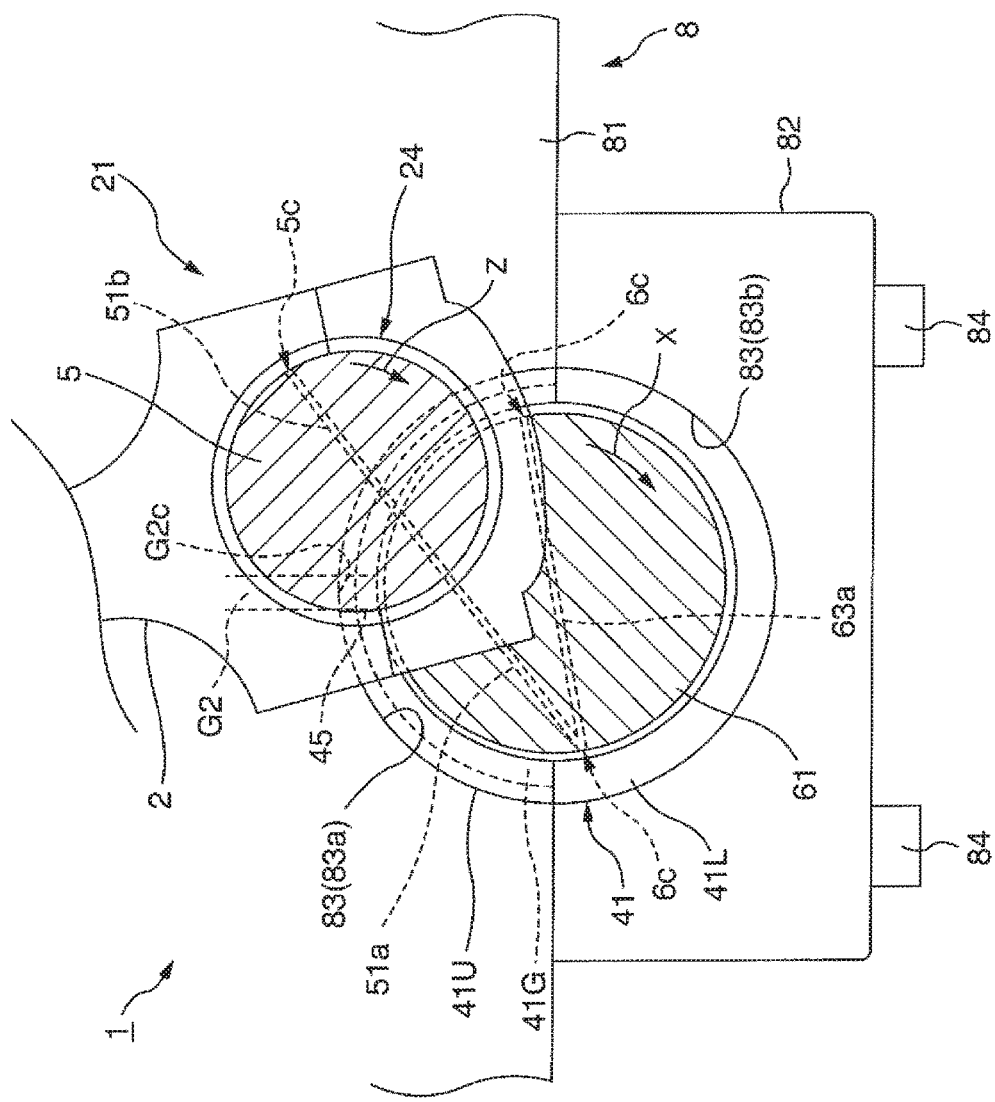
FIG. 2 is a front view of a first journal portion having a lubricating oil passage.
Figure 3:
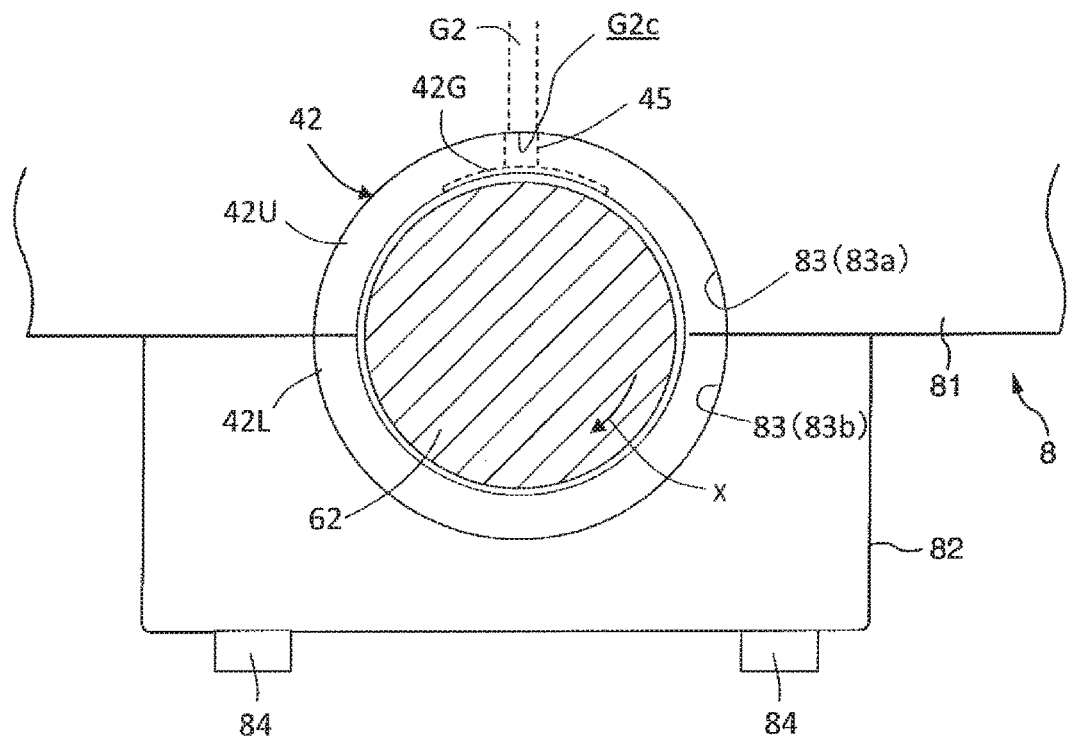
FIG. 3 is a front view of a second journal portion not having the lubricating oil passage.

FIG. 1 is a schematic view illustrating a bearing apparatus 1 of a crankshaft 3 of the present invention applied to an in-line four-cylinder internal combustion engine. FIG. 2 illustrates a bearing structure of a journal portion 61 having a lubricating oil passage 63a for supplying oil to a crank pin portion 5 of the bearing apparatus 1 illustrated in FIG. 1. Note that the journal portion 61 includes journal portions No. 2 and No. 4 (61A, 61B) in FIG. 1, and the "journal portion having a lubricating oil passage" is hereinafter referred to as a "first journal portion." FIG. 3 illustrates a bearing structure of a journal portion 62 not having the lubricating oil passage for supplying oil to the crank pin portion 5 of the bearing apparatus 1 illustrated in FIG. 1. Note that the journal portion 62 includes journal portions No. 1, No. 3, and No. 5 (62A, 62B, 62C) in FIG. 1, and the "journal portion not having the lubricating oil passage" is hereinafter referred to as a "second journal portion."

Entire Configuration of Bearing Apparatus

As illustrated in FIG. 1, the bearing apparatus 1 of the present embodiment includes the crankshaft 3 having five journal portions 6 (61A, 61B, 62A, 62B, 62C) supported by a cylinder block and four crank pin portions 5 (5A to 5D). The crank pin portions 5 are integrally formed with the journal portions 6 between the journal portions 6 and are rotated around the journal portions 6. In addition, the bearing apparatus 1 includes five main bearings 4 rotatably supporting the journal portions 6 (61A, 61B, 62A, 62B, 62C) respectively as sliding bearings supporting the crankshaft 3; four connecting rods 21 rotatably supporting the crank pin portions 5 (5A to 5D) respectively; and connecting rod bearings 24 (not illustrated in FIG. 1). The crankshaft 3 of a compact internal combustion engine for a passenger car is made of an Fe alloy and the journal portion 6 has a diameter of about 40 mm to 100 mm. In general, a plurality of journal portions 6 has the same diameter.

A first main bearing 41 supporting a first journal portion 61 includes a pair of half bearings (upper half bearing 41U and lower half bearing 41L). A second main bearing 42 supporting a second journal portion 62 includes a pair of half bearings (upper half bearing 42U and lower half bearing 42L). The half bearing includes an Fe alloy back metal layer and a bearing alloy (Al alloy, Cu alloy, etc.) layer. Main bearings 41 and 42 have an inner diameter corresponding to the diameter of the journal portion and a wall thickness of about 1.5 mm to 3.0 mm.

The Al alloy cylinder block includes bearing housings 8 each located in corresponding journal portions 6. The bearing housing 8 includes an Al alloy upper housing 81 constituting a part of the cylinder block and a lower housing 82 serving as an Fe alloy bearing cap. The upper housing 81 and the lower housing 82 have semi-cylindrical surfaces 83a and 83b aligned with the half bearings 41U, 41L, 42U, and 42L. When the upper housing 81 and the lower housing 82 are integrally tightened with a bolt 84, a cylindrical shaped bearing holding hole 83 is formed. The cylindrical shaped main bearings 41 and 42 are held by the bearing holding hole 83.

The oil pumped by an oil pump P is supplied into an oil gallery G1 formed inside the cylinder block wall and then into five internal oil passages G2 branched from the oil gallery G1. The internal oil passage G2 opens in the semi-cylindrical surface 83a of the upper housing 81. The oil flowing through the opening G2c of the internal oil passage G2 passes through the oil hole 45 formed through the walls of the main bearings 41 and 42, and then is supplied into the oil grooves 41G and 42G formed in the inner peripheral surfaces of the main bearings 41 and 42.

FIG. 1 illustrates the bearing apparatus 1 of the crankshaft 3 for a four-cylinder internal combustion engine. As illustrated in FIG. 1, the five journal portions 6 of the crankshaft 3 are numbered from 1 to 5 starting with the front (Fr) side toward the rear (Rr) side, and four crank pin portions 5 are numbered from 1 to 4 starting with the front (Fr) side toward the rear (Rr) side. The No. 2 and No. 4 journal portions 61A and 61B include the first lubricating oil passage 63a formed through in a diameter direction of the journal portions. Further, two second lubricating oil passages 51a are formed branched from the first lubricating oil passage 63a so as to pass through the crank arm portion. The second lubricating oil passage 51a communicates with a third lubricating oil passage 51b formed through in the diameter direction of the No. 1 to No. 4 crank pin portions 5A to 5D. The No. 1, No. 3, and No. 5 journal portions 62A, 62B, and 62C do not have the lubricating oil passage formed inside the journal portions. Note that the crankshaft 3 is not limited to the configuration illustrated in FIG. 1 as long as the crankshaft 3 includes a plurality of journal portions 6 and the lubricating oil passage 63a is not formed inside at least one of the journal portions.

In FIG. 2, the positional relationship in the paper depth direction is such that the first journal portion 61 is located on the rear side of the paper and the crank pin portion 5 is located on the front side of the paper.

The first journal portion 61 is supported by the Al alloy cylinder block of the internal combustion engine with the first main bearing 41 therebetween. The first main bearing 41 includes a pair of the upper half bearing 41U and the lower half bearing 41L. The oil groove 41G is formed in the inner peripheral surface throughout the entire length in the circumferential direction of the upper half bearing 41U. In addition, the first journal portion 61 has the lubricating oil passage 63a formed through in the diameter direction. When the first journal portion 61 rotates in the direction of the arrow X, the end openings 6c of the lubricating oil passage 63a alternately communicate with the oil groove 41G of the first main bearing 41.

The crank pin portion 5 is supported by a large end portion housing 21 of a connecting rod 2 through a connecting rod bearing 24 composed of the pair of half bearings.

As described above, regarding the first main bearing 41, the lubricating oil pumped by the oil pump P is supplied from the internal oil passage G2 formed inside the cylinder block wall, passing through the oil hole 45 formed through the wall of the upper half bearing 41U, into the oil groove 41G formed throughout the entire length in the circumferential direction of the inner peripheral surface of the upper half bearing 41U.

Further, the first lubricating oil passage 63a is formed through in the diameter direction of the first journal portion 61, and the end openings 6c of the first lubricating oil passage 63a communicate with the lubricating oil groove 41G. In addition, the second lubricating oil passage 51a is formed branching from the first lubricating oil passage 63a of the first journal portion 61 to pass through the crank arm portion (unillustrated), and the third lubricating oil passage 51b is formed through in the diameter direction of the crank pin portion 5.

Thus, the oil passes through the first lubricating oil passage 63a and the second lubricating oil passage 51a, then passing through a discharge port 5c of the end portion of the third lubricating oil passage 51b, and is supplied into the clearance formed between the crank pin portion 5 and the connecting rod bearing 24.

As illustrated in FIG. 3, the second journal portion 62 is supported by the Al alloy cylinder block of the internal combustion engine with the second main bearing 42 therebetween, and the second main bearing 42 includes a pair of the upper half bearing 42U and the lower half bearing 42L. The inner peripheral surface of the upper half bearing 42U has an oil groove 42G partially formed in the circumferential direction.

As described above, the lubricating oil pumped by the oil pump P toward the second main bearing 42 passes through the internal oil passage G2 formed inside the cylinder block wall, then passing through the oil hole 45 formed through the wall of the upper half bearing 42U, and then is supplied into the oil groove 42G partially formed in the circumferential direction in the inner peripheral surface of the upper half bearing 42U.

Figure 4:
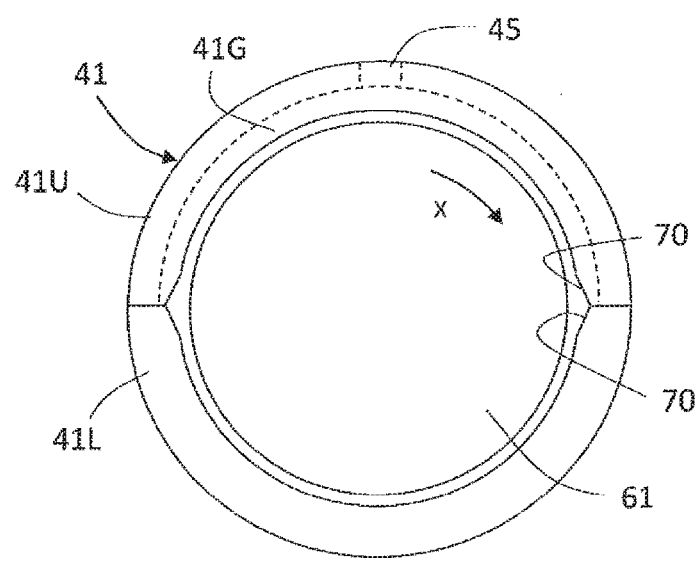
FIG. 4 is a front view of a first main bearing 41 illustrated in FIG. 2.
Figure 5:
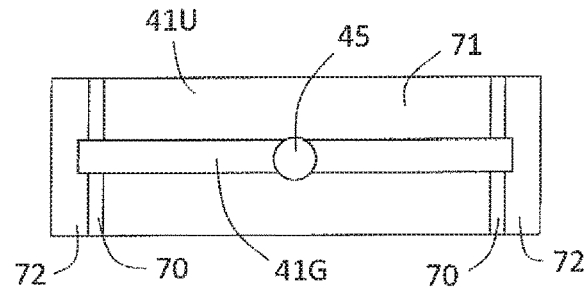
FIG. 5 is a view illustrating an inner peripheral surface side of an upper half bearing 41U illustrated in FIG. 4.

FIG. 4 is a front view of the first main bearing 41 supporting the first journal portion 61 illustrated in FIG. 2. FIG. 5 illustrates the inner surface of the upper half bearing 41U.

A crash relief 70 is formed in a region adjacent to the circumferential end faces 72 of the upper and lower half bearings 41U and 41L The crash relief 70 has a wall thickness smaller than the wall thickness of the original inner peripheral surface 71 (main arc). The crash relief 70 is provided to form a crash relief clearance 70c for absorbing positional displacement and deformation of the butt end faces (circumferential end faces 72) in the state where the pair of half bearings 41U and 41L is assembled into the bearing housing 8 (for example, see SAE J506 (items 3.26 and 6.4), DIN1497 (section 3.2), and JIS D3102). In the case of the bearing of a compact internal combustion engine for a passenger car, the depth (distance from the original inner peripheral surface up to the actual inner peripheral surface) of the crash relief in the circumferential end face of the half bearing is generally about 0.01 to 0.075 mm, and the length thereof (length in the vertical direction from the circumferential end face in the half bearing up to the upper edge portion of the crash relief 70 with respect to the end face) is about 3 to 7 mm. It should be noted that the same crash relief 70 as that of the upper and lower half bearings 41U and 41L is formed in the upper and lower half bearings 42U and 42L constituting the second main bearing 42.

In the first embodiment, the upper half bearing 41U includes the oil groove 41G formed throughout the entire length in the circumferential direction of the inner peripheral surface. In the first embodiment, the groove depth D1 of the oil groove 41G and the axial length of the oil groove 41G (width of the oil groove 41G) have substantially constant size along the circumferential direction of the upper half bearing 41U. When the journal portion of the crankshaft 3 of a compact internal combustion engine has a diameter of 40 to 100 mm, and the depth D1 of the oil groove 41G is about 1 mm to 2.5 mm. The larger the diameter of the journal portion, the larger the groove depth D1 of the oil groove 41G.

In addition, the oil groove 41G portion includes the oil hole 45 formed through the wall of the upper half bearing 41. In the present embodiment, one oil hole 45 is formed in the center portion of the circumferential length of the upper half bearing 41 and in the axial center portion thereof. The lubricating oil passage 63a in the surface of the first journal portion 61 has an opening 6c with a diameter of generally about 3 to 8 mm, and the axial length of the oil groove 41G is slightly greater than the diameter of the opening 6c of the lubricating oil passage 63a. In addition, like the first embodiment, in the case where the oil hole 45 has an circular opening, the diameter of the opening is slightly greater than the axial length of the oil groove 41G.

Since the oil groove 41G is formed throughout the entire length of the inner peripheral surface, one of the two openings 6c of the lubricating oil passage 63a communicates with the oil groove 41G, thus allowing oil to be always supplied to the crank pin portion 5.

Note that unlike the present embodiment, the oil groove 41G may be changed such that the circumferential end portions of the oil groove 41G is located in the crash relief 70. Alternatively, the oil groove 41G may be changed such that one circumferential end portion of the oil groove 41G is located in the crash relief, and the other circumferential end portion is located in the circumferential end face 72 of the upper half bearing 41U. Still alternatively, the oil groove 41G may be changed such that the axial length of the oil groove is the largest near the center portion of the circumferential length of the oil groove 41G, and becomes smaller towards the circumferential end portion side of the oil groove 41G. Still alternatively, the oil groove 41G may be changed such that the groove depth D1 of the oil groove 41G is the largest in the center portion of the circumferential length of the oil groove 41G, and becomes smaller towards the circumferential end portion side of the oil groove 41G.

The lower half bearing 41L has the same size and shape as those of the upper half bearing 41U except that the lower half bearing 41L does not have the structure of the oil groove 41G and the oil hole 45.

In addition, in the bearing apparatus 1 illustrated in FIG. 1, the main bearings 41 of No. 2 and No. 4 journal portions 61A and 61B have the same size and shape with each other.

Figure 6:
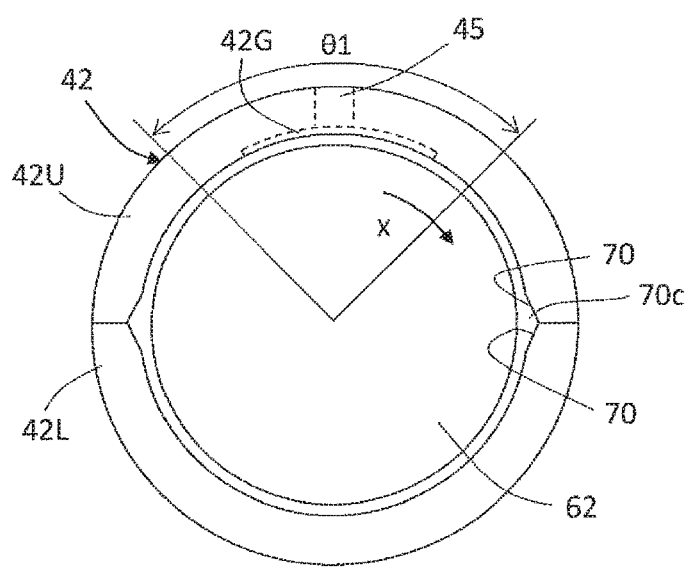
FIG. 6 is a front view of a second main bearing 42 illustrated in FIG. 2.
Figure 7:
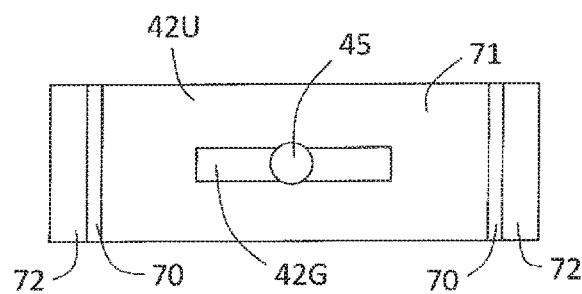
FIG. 7 is a view illustrating an inner peripheral surface side of an upper half bearing 42U illustrated in FIG. 6.

FIG. 6 is a front view of the second main bearing 42 supporting the second journal portion 62 illustrated in FIG. 3. FIG. 7 illustrates the inner surface of the upper half bearing 42U.

The second main bearing 42 includes a pair of upper half bearing 42U and lower half bearing 42L. The upper half bearing 42U and the lower half bearing 42L have a semi-cylindrical shape with the same bearing inner diameter, bearing outer diameter, and bearing width as those of the pair of upper and lower half bearings 41U and 41L, and include the crash relief 70 with the same size. In addition, the same oil hole 45 as in the upper half bearing 41U is formed in the upper half bearing 42U.

The oil groove 42G is partially formed in the circumferential direction of the inner peripheral surface of the upper half bearing 42U. The groove depth of the oil groove 42G and the axial length of the groove (groove width) is set to constant except the circumferential end portions.

The oil groove 42G is formed in a range of a circumferential angle of ±45° with respect to the circumferential center portion of the upper half bearing 42U at a maximum distance. Therefore, the circumferential end portion of the oil groove 42G is not located in the crash relief of the upper half bearing 42U and is not open in the circumferential end face of the half bearing 42U. The maximum formation range (range of a circumferential angle of ±45° with respect to the circumferential center portion of the half bearing 42U) of the oil groove 42G is a region having a large change in clearance between the surface of the second journal portion 62 and the groove bottom surface (inner surface) of the oil groove 42G when the temperature of the bearing apparatus 1 (bearing housing 8) is changed as described later.

Figure 8:
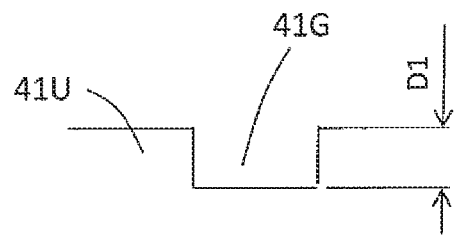
FIG. 8 is a cross-sectional view of an oil groove 41G of the upper half bearing 41U.

In addition, the groove depth D2 (see FIG. 9) of the oil groove 42G is one half or less than the groove depth D1 (see FIG. 8) of the oil groove 41G. For example, when the groove depth D1 of the oil groove 41G is 1.0 mm, the groove depth D2 of the oil groove 42G is 0.5 mm or less.

The groove width of the oil groove 42G of the present embodiment is the same as the groove width of the oil groove 41G. Note that the groove width of the oil groove 42G is not limited to this, but may be smaller than or greater than the groove width of the oil groove 41G. Note also that the groove width of the oil groove 42G may be changed in the circumferential direction.

The maximum depth of the groove depth D2 of the oil groove 42G is preferably 0.1 mm or greater. Even if the depth D1 of the oil groove 41G is greater than 1.0 mm, the groove depth of the oil groove 42G is preferably 0.5 mm or less. The reason for this, as described later, is that oil inside the oil groove 42G is suitably sheared at a low temperature, the groove volume can be reduced, and the amount of oil supply during regular operation can be decreased.

In addition, in the bearing apparatus 1 illustrated in FIG. 1, the second main bearings 42 of No. 1, No. 3 and No. 5 journal portions 62A, 62B, and 62C not having the lubricating oil passage have the same size and shape with each other. In addition, the second main bearings 42 have the same outer diameter, inner diameter, and bearing width (axial length) as those of the first main bearings 41 of the No. 2 and No. 4 journal portions 61A and 61B. Note that each of the main bearings 41 and 42 may have a different outer diameter, inner diameter, and bearing width for each journal portion.

Now, the description focuses on the bearing housing including the Al alloy upper housing and the Fe alloy lower housing. The upper housing 81 and the lower housing 82 of the bearing housing 8 is processed at room temperature (for example about 20° C.) in the state of being tightened with Fe alloy bolts 84, and the cylindrical shaped bearing holding hole 83 for holding the main bearing 4 is formed (see FIG. 10A). Subsequently, the bolt 84 is relaxed, and then the upper half bearings 41U and 42U and the lower half bearings 41L and 42L are assembled into the semi-cylindrical surfaces 83*a* and 83*b* of the upper housing 81 and the lower housing 82 respectively. Then, the journal portion 6 of the crankshaft is installed in the inner diameter portion of the upper half bearings 41U and 42U and the lower half bearings 41L and 42L. Then, the upper housing 81 and the lower housing 82 are tightened again with bolts, so that the main bearings 41 and 42 are held by the bearing holding hole 83 of the bearing housing 8.

Figure 10A:
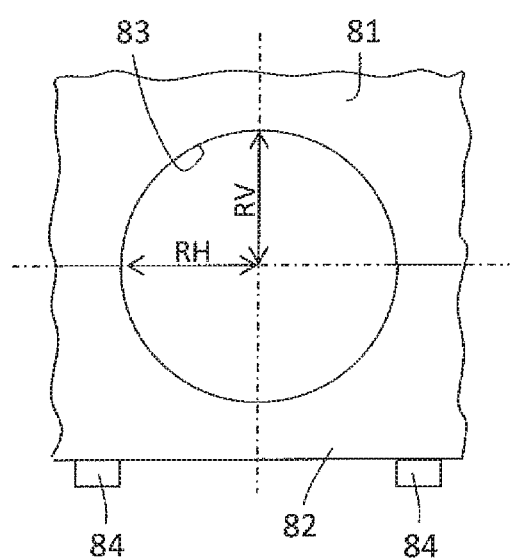
FIG. 10A is a view illustrating a change of a bearing holding hole 83 of a bearing housing 8.
Figure 10B:
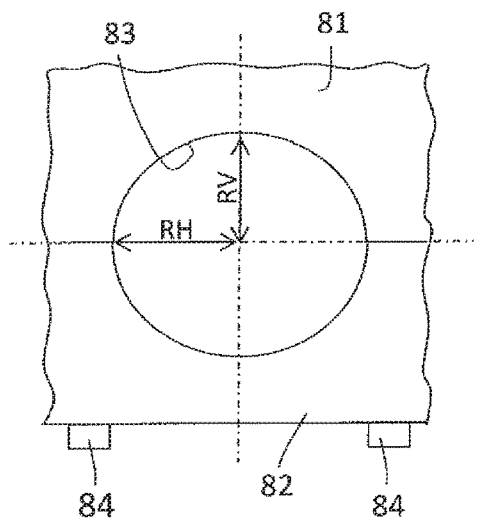
FIG. 10B is a view illustrating a change of a bearing holding hole 83 of a bearing housing 8.
Figure 10C:
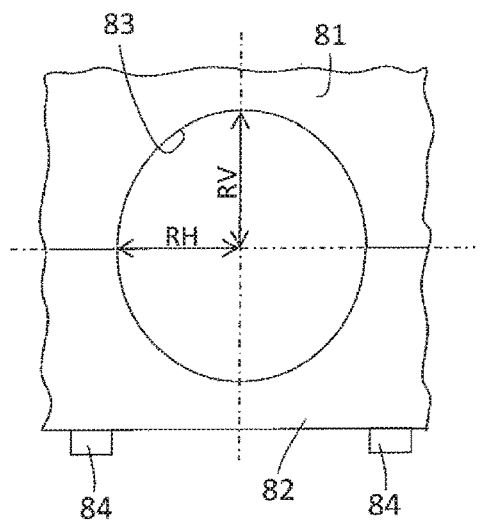
FIG. 10C is a view illustrating a change of a bearing holding hole 83 of a bearing housing 8.

A change in temperature changes the amount of expansion deformation or contraction deformation due to a difference in thermal expansion coefficient between the upper housing 81 and the lower housing 82. FIGS. 10A to C illustrate deformation of the bearing holding hole 83 of the bearing housing 8 according to a change in temperature.

FIG. 10A illustrates the bearing holding hole 83 of the bearing housing 8 assuming that the bearing apparatus is located at a temperature of about 20° C. The inner radius RH in a direction parallel to the butt end faces of the upper housing is the same as the inner radius RV in a direction perpendicular to the butt end faces thereof with respect to the semi-cylindrical surface of the Al alloy upper housing 81.

FIG. 10B illustrates the bearing holding hole 83 of the bearing housing 8 assuming that the bearing apparatus 1 is located at a temperature of –30° C. in a cold area. The inner radius RV in a direction perpendicular to the butt end faces is smaller than the radius RH in a direction parallel to the butt end faces of the upper housing 81 with respect to the semi-cylindrical surface 83*a* of the upper housing 81.

The reason for this is as follows. When the bearing housing 8 is subjected to contraction deformation according to a change in temperature from about 20° C. (FIG. 10A) to –30° C. (FIG. 10B), the amount of contraction deformation of the upper housing 81 is greater than the amount of contraction deformation of the lower housing 82. The Al alloy housing and Fe alloy housing having relatively different thermal expansion coefficients are tightened with bolts, and compressive stress occurs in a direction perpendicular to the butt end faces near the butt end faces of the housings. The butt end faces of the Fe alloy lower housing 82 having a relatively low thermal expansion coefficient act as a resistance to contraction deformation near the butt end faces of the Al alloy upper housing 81 having a relatively high thermal expansion coefficient. For this reason, thermal contraction is suppressed near the butt faces between the upper housing 81 and the lower housing 82, but the amount of thermal contraction is increased by the amount of thermal contraction reduced near the butt end faces, in a region of a circumferential angle of ±45° with respect to the circumferential center portion of the semi-cylindrical surface 83*a* of the upper housing 81 not affected by compressive stress caused by bolting.

FIG. 10C illustrates the bearing holding hole 83 of the bearing housing 8 assuming that the bearing apparatus 1 is located at a temperature of about 120° C. during regular operation of the internal combustion engine. The inner radius RV in a direction perpendicular to the butt end faces is larger than the inner radius RH in a direction parallel to the butt end faces of upper housing with respect to the semi-cylindrical surface of the Al alloy upper housing 81.

When the temperature of the bearing housing 8 is increased to 120° C. (due to an increase in temperature by operation of the internal combustion engine), the butt end faces of the Fe alloy lower housing 82 having a relatively low thermal expansion coefficient serve as a resistance to thermal expansion deformation near the butt end faces of the Al alloy upper housing 81 having a relatively high thermal expansion coefficient. For this reason, thermal expansion is suppressed near the butt faces between the upper housing 81 and the lower housing 82, but the amount of thermal expansion is increased by the amount of thermal expansion reduced near the butt end faces, in a region of a circumferential angle of ±45° with respect to the circumferential center portion of the semi-cylindrical surface 83*a* of the upper housing 81 not affected by compressive stress caused by bolting.

When a pair of upper and lower half bearings 42U and 42L and the second journal portion 62 are installed in the bearing housing 8 illustrated in FIGS. 10A to C, it can be understood that the range forming the oil groove 42G in the upper half bearing 42U is a region having the largest amount of change in the inner radius of the bearing holding hole of the bearing housing 8, particularly the largest amount of change in radius of the semi-cylindrical surface 83*a* of the upper housing 81. A change in temperature of the bearing housing 8 increases the amount of change in clearance between the groove bottom surface (inner circumference) of the oil groove 42G and the surface of the second journal portion 62 in the range forming the oil groove 42G.

In the bearing apparatus 1 of the present embodiment, the groove depth D2 of the oil groove 42G is one half or less than the depth D1 of the oil groove 41G, and a small value is set to the clearance between the groove bottom surface (inner surface) of the oil groove 42G and the surface of the second journal portion 62. Further, the range forming the oil groove 42G in the inner peripheral surface of the upper half bearing 42U is a range of a circumferential angle of ±45° with respect to the circumferential center portion of the upper half bearing 42U at a maximum distance. When the temperature of the bearing housing 8 is changed, the oil groove 42G is formed in a region having a large change in clearance between the groove bottom surface (inner peripheral surface) of the oil groove 42G and the surface of the journal portion 62.

When the internal combustion engine is in a low temperature state (for example, about –30° C.), the difference in thermal expansion coefficient between the upper housing 81 and the second journal portion 62 of the Fe alloy crankshaft 3 causes a very small bearing clearance between the inner peripheral surface of the second main bearing 42 and the surface of the second journal portion 62. The oil supplied into the oil groove 42G from outside is in a low temperature state and in a high viscosity state for some time immediately after the start of the internal combustion engine. When the oil supplied into the oil groove 42G is in a high viscosity state, the oil is unlikely to flow from the oil groove 42G into the bearing clearance, and particularly the oil is unlikely to be supplied into the bearing clearance between the inner peripheral surface of the lower half bearing 42L and the surface of the second journal portion 62.

The second main bearing 42 of the bearing apparatus 1 of the present embodiment allows a sufficiently small clearance between the groove bottom surface of the oil groove 42G and the surface of the second journal portion 62 even if the oil supplied into the oil groove 42G from outside is in a low temperature state and in a high viscosity state. Thus, when the internal combustion engine is started, all the oil inside the oil groove 42G including the oil on the groove bottom surface side of the oil groove 42G is strongly influenced by the force from the surface of the rotating journal portion 62 to be forcibly supplied toward the front side in the rotation direction of the journal portion. During this time, a sufficient shearing force is applied to the oil, the oil temperature rises promptly, and the oil viscosity decreases. This also allows the oil to flow from inside the oil groove 42G into a narrow bearing clearance between the inner peripheral surface of the upper half bearing 42U and the surface of the journal portion 62, and also promptly flow into the bearing clearance between the inner peripheral surface of the lower half bearing 42L and the surface of the journal portion 62. Note that the oil groove 42G is formed in a range of a circumferential angle of at least 10° or higher in a range having a circumferential angle of ±45° with respect to the circumferential center portion of the upper half bearing 42U at a maximum distance, and this range ensures the amount of oil to be supplied into the bearing clearance between the inner peripheral surface of the upper half bearing 42U and the surface of the journal portion 62, and the bearing clearance between the inner peripheral surface of the lower half bearing 42L and the surface of the journal portion 62 when the internal combustion engine is started.

Figure 9:
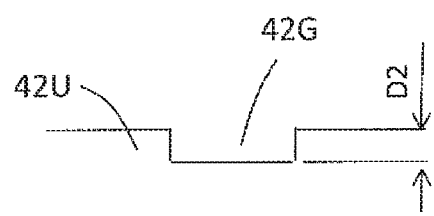
FIG. 9 is a cross-sectional view of an oil groove 42G of the upper half bearing 42U.

Note that as illustrated in FIG. 9, the oil groove 42G preferably has a groove bottom surface flat in the cross-sectional view of the oil groove 42G and parallel to the surface of the first journal portion 62 because a sufficient shearing force is likely to be applied to the oil. The cross-sectional shape of the oil groove 42G is not limited to the rectangular cross-sectional shape illustrated in FIG. 9, but may be changed to an inverted trapezoidal cross-sectional shape, an arcuate cross-sectional shape, etc.

The reason why the groove depth D2 of the oil groove 42G is one half or less than the groove depth D1 of the oil groove 41G is as follows. The bearing apparatus 1 of the present invention is suitable for a compact internal combustion engine for a passenger car. For example, when the diameter of the journal portion of the crankshaft is 40 to 100 mm, the groove depth D1 of the oil groove 41G is 1 to 2.5 mm. The larger the diameter of the journal portion, the larger the groove depth D1 of the oil groove 41G. For example, when the groove depth D1 of the oil groove 41G is 2.5 mm, the groove depth D2 of the oil groove 42G may be up to 1.25 mm. In this case, the large diameter of the journal portion 62 can increase the force of the surface of the rotating journal portion, allowing the oil inside the oil groove 42G to be sufficiently sheared at a low temperature, the oil temperature to rise promptly, and the viscosity to decrease.

In addition, the present invention can reduce the amount of oil to be supplied to the second main bearing 42 during regular operation of the internal combustion engine, and accordingly can reduce the amount of oil to be supplied to the entire bearing apparatus 1.

The reason for this is as follows. (1) First, the maximum range forming the oil groove 42G is one half of the entire circumferential length of the inner peripheral surface of the upper half bearing 42U, and the groove depth D2 is one half or less than the groove depth D1 of the oil groove 41G, thus reducing the internal volume of the oil groove 42G.

(2) Further, as described above, the oil groove 42G is formed in a region having a range where a change in temperature of the bearing housing 8 increases the change in clearance between the groove bottom surface of the oil groove 42G and the surface of the journal portion 62, which accordingly increases the clearance between the groove bottom surface of the oil groove 42G and the surface of the journal portion 62 when the bearing housing 8 is in a high temperature state (for example, 120° C.) during regular operation of the internal combustion engine. Therefore, the force from the surface of the rotating journal portion 62 acts only on the oil near the surface side of the journal portion 62 in the oil groove 42G, and does not act on the oil on the groove bottom surface side. For this reason, the force from the surface of the rotating journal portion 62 acts on all oil in the oil groove 42G like in a low temperature state, thus preventing the oil from flowing towards the front side in the rotation direction of the journal portion 62. The oil flowing from the oil groove 42G is limited to a small amount of oil near the journal surface side in the oil groove 42G incidentally flowing in the surface of the rotating journal portion 62.

(3) Further, the circumferential end portions of the oil groove 42G are located in the inner peripheral surface of the upper half bearing 42U and is closed by the inner peripheral surface, and thus the oil is unlikely to flow from the circumferential end portion. The circumferential end portions of the oil groove 42G do not communicate with the crash relief 70, thus preventing the oil in the oil groove 42G from flowing outside the bearing from the axial end portions of the relief clearance 70c between the crash relief 70 and the surface of the journal portion 62.

These effects can minimize the amount of oil supplied to the second main bearing 42 supporting the second journal portion 62, and can reduce the amount of oil supplied to the bearing apparatus 1 by this amount.

In case the oil groove 42G is formed in a range exceeding the formation rage of the present invention (the range of an angle of ±45° with respect to the circumferential center portion), the change in clearance between the groove bottom surface of the oil groove 42G and the surface of the journal portion is not sufficient in a portion other than the formation range of the present invention. Therefore, when the internal combustion engine is started at a low temperature, the clearance between the groove bottom surface of the oil groove 42G in a portion other than the formation range of the present invention and the surface of the journal portion becomes large, resulting in that the oil is not sheared, the oil remains in a high viscosity state, and the oil is supplied to the sliding surface of the lower half bearing with a delay.

Further, during regular operation of the internal combustion engine, the clearance between the groove bottom surface of the oil groove 42G in a portion other than the formation range of the present invention and the surface of the journal portion is small, resulting in that the oil in the oil groove is likely to be influenced by the force from the surface of the rotating journal portion, thus increasing the amount of oil to flow from within the oil groove. In addition, when the oil groove 42G communicates with the crash relief 70 of the upper half bearing 42U (when the circumferential end portions of the oil groove 42G are located in the crash relief 70), the amount of oil to flow outside from the relief clearance 70c is increased during regular operation of the internal combustion engine.

In addition, when the oil groove depth D2 of the oil groove 42G exceeds one half of the groove depth D1 of the oil groove 41G, the oil inside the oil groove immediately after the start of the internal combustion engine at a low temperature is unlikely to be sheared, the temperature does not rise promptly, and the oil viscosity is unlikely to decrease. In addition, the internal volume of the oil groove is increased and thus the amount of oil supply during regular operation is increased.

Note that when the structure of a pair of Fe alloy upper and lower housings or the structure of a pair of Al alloy upper and lower housings is used as the bearing housing 8, the bearing holding hole of the bearing housing is not subjected to thermal expansion deformation as illustrated in FIGS. 10A to C, and thus the effects of the present invention cannot be obtained.

Second Embodiment

Figure 11:
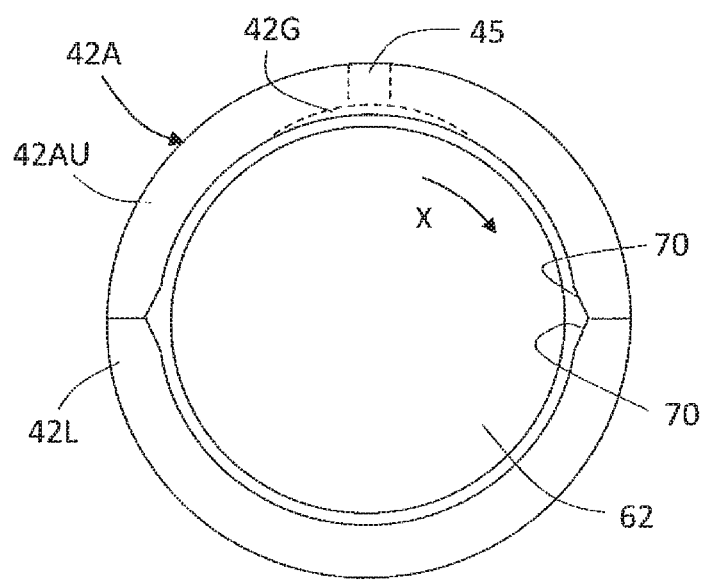
FIG. 11 is a front view of a second main bearing 42A of a second embodiment.
Figure 12:
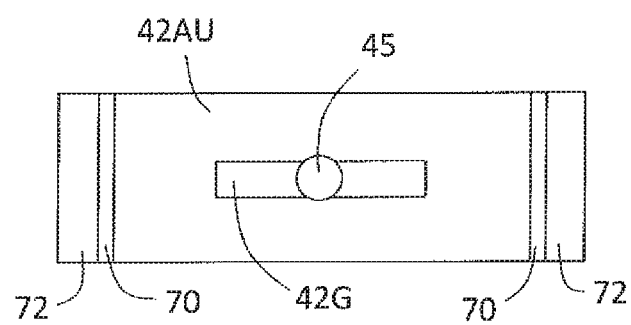
FIG. 12 is a bottom plan view of an upper half bearing 41AU illustrated in FIG. 11.

Now, with reference to FIGS. 11 and 12, the description focuses on the second main bearing 42A supporting the second journal portion 62 including an upper half bearing 42AU having a different form from that of the first embodiment. It should be noted that the same reference numerals or characters are assigned to the identical or equivalent parts described in the first embodiment in the following description.

Configuration

First, the configuration is described. The configuration of the first main bearing 41 supporting the first journal portion 61 of the present embodiment is the same as that of the first embodiment. The configuration of the second main bearing 42A is substantially the same as that of the first embodiment except the shape of the oil groove 42G of the upper half bearing 42AU.

More specifically, as illustrated in FIG. 11, the groove depth D2 of the oil groove 42G of the present embodiment is configured to be the largest near the center portion of the circumferential length of the oil groove 42G and to become smaller toward the circumferential end portions of the oil groove 42G.

When the groove depth D2 of the oil groove 42G is changed in the circumferential direction like the second embodiment, the groove depth D2 of the oil groove 42G of the upper half bearing 42AU is one half or less than the groove depth D1 of the oil groove 41G at the corresponding position in the circumferential direction in the entire circumferential direction (in any position in the circumferential direction).

Effect

When the internal combustion engine is started at a low temperature, in a region having a small groove depth D2 of the oil groove 42G on the front side in the rotation direction of the second journal portion 62 (in the direction indicated by arrow X in FIG. 11), the force from the surface of the rotating journal portion is likely to act on the oil at a low temperature, resulting in that the oil is sufficiently sheared, the oil temperature rises promptly, the oil viscosity can be decreased, and thus the oil is promptly supplied to the sliding surface of the second main bearing 42A.

Third Embodiment

Figure 13:
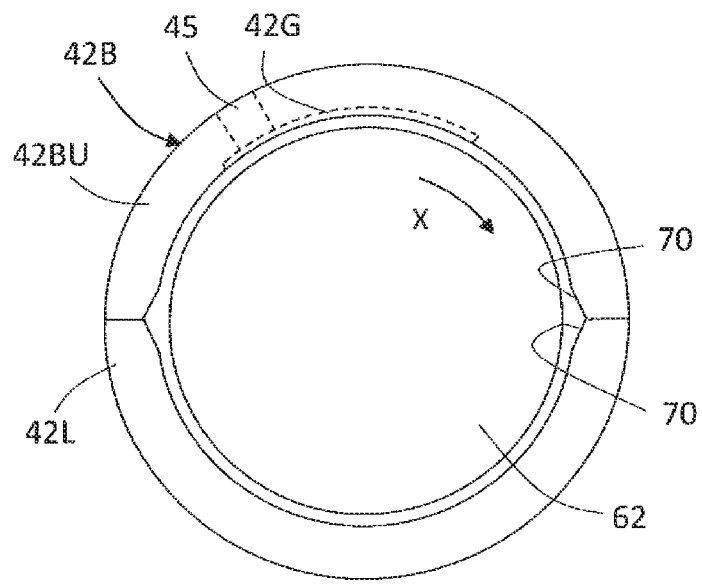
FIG. 13 is a front view of a second main bearing 42B of a third embodiment.
Figure 14:
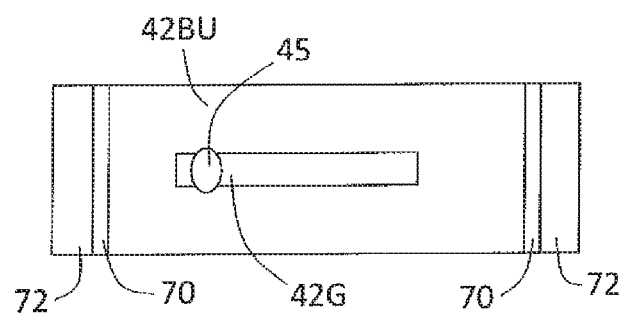
FIG. 14 is a bottom plan view of an upper half bearing 42BU illustrated in FIG. 13.

Now, with reference to FIGS. 13 and 14, the description focuses on the second main bearing 42B supporting the second journal portion 62 including an upper half bearing 42BU having a different form from that of the first and second embodiments. It should be noted that the same reference numerals or characters are assigned to the identical or equivalent parts described in the first embodiment in the following description.

Configuration

First, the configuration is described. The configuration of the first main bearing 41 supporting the first journal portion 61 of the present embodiment is the same as that of the first embodiment. The configuration of the second main bearing 42B is substantially the same as that of the first and second embodiments except the shape of the oil groove 42G of the upper half bearing 42BU and the position of the oil hole 45.

More specifically, as illustrated in FIG. 13, the groove depth D2 of the oil groove 42G of the present embodiment is constant except the circumferential end portions. The circumferential center portion of the oil groove 42G is located closer to the rear side in the rotation direction (the direction indicated by arrow X) of the second journal portion 62 than the circumferential center portion of the half bearing 41BU. The oil hole 45 is located closer to the rear side in the rotation direction of the second journal portion 62 than the center portion of the circumferential length of the oil groove 42G.

Effect

The half bearing 42BU is configured such that the oil hole 45 is located closer to the rear side in the rotation direction of the journal portion than the center portion of the circumferential length of the oil groove 42G, and thus the oil introduced from the oil hole 45 into the oil groove 42G is likely to flow toward the front side in the rotation direction of the journal portion 62 into the oil groove 42G. Further, the circumferential center portion of the oil groove 42G is configured to be located closer to the rear side in the rotation direction of the journal portion 62 than the circumferential center portion of the half bearing 41BU, and thus the groove bottom surface of the oil groove 42G is formed in the circumferential center portion of the half bearing 42BU having the largest amount of change in clearance between the groove bottom surface of the oil groove 42G and the surface of the second journal portion 62 (not having the opening portion of the oil hole 45G). Therefore, particularly when the internal combustion engine is started at a low temperature, the above configuration can improve the effects of promptly increasing the oil temperature and decreasing the oil viscosity.

Fourth Embodiment

Figure 15:
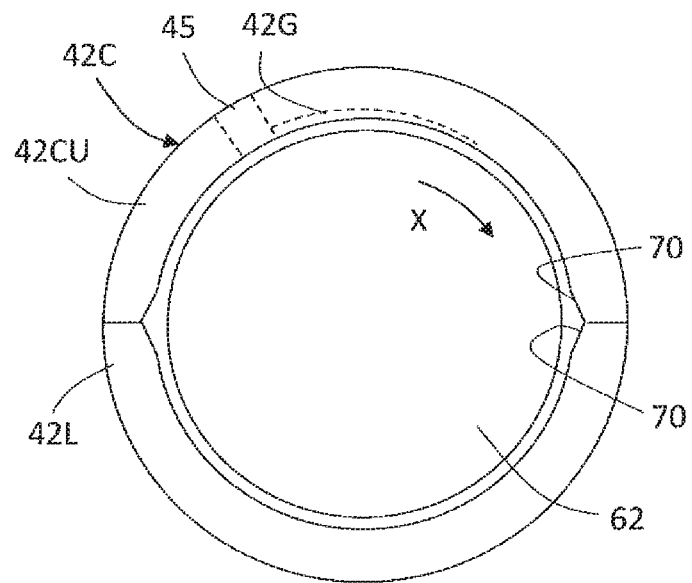
FIG. 15 is a front view of a second main bearing 42C of a fourth embodiment.
Figure 16:
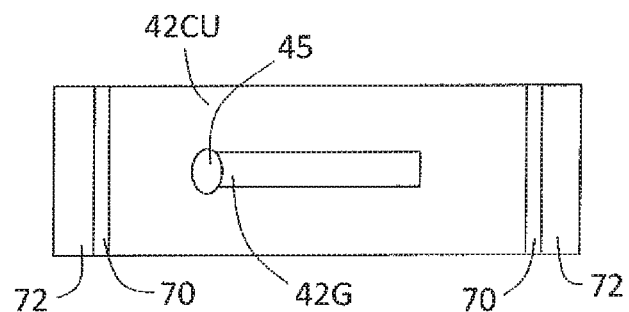
FIG. 16 is a bottom plan view of an upper half bearing 42CU illustrated in FIG. 15.

Now, with reference to FIGS. 15 and 16, the description focuses on the second main bearing 42C supporting the second journal portion 62 including an upper half bearing 42CU having a different form from that of the first, second, and third embodiments. It should be noted that the same reference numerals or characters are assigned to the identical or equivalent parts described in the first embodiment in the following description.

Configuration

First, the configuration is described. The configuration of the first main bearing 41 supporting the first journal portion 61 of the present embodiment is the same as that of the first embodiment. The configuration of the second main bearing 42C is substantially the same as that of the first, second, and third embodiments except the shape of the oil groove 42G of the upper half bearing 42CU and the position of the oil hole 45.

More specifically, as illustrated in FIG. 15, the oil hole 45 of the upper half bearing 41CU of the present embodiment is configured such that the center of the opening of the oil hole 45 is located at a circumferential angle of 30° on the rear side in the rotation direction (the direction indicated by arrow X) of the second journal portion 62 from the circumferential center portion of the upper half bearing 42CU. The circumferential end portion of the oil groove 42G on the rear side in the rotation direction of the second journal portion 62 communicates with the oil hole 45. The oil groove depth D2 is the largest at a position communicating with the oil hole 45, and becomes smaller toward the circumferential end portion on the front side in the rotation direction of the journal portion 62.

Effect

The upper half bearing 42CU is configured such that the oil hole 45 communicates with the end portion on the rear side in the rotation direction of the journal portion of the oil groove 42G, and thus the oil introduced from the oil hole 45 into the oil groove 42G flows only on the front side in the rotation direction of the journal portion 62 of the oil groove 42G. Therefore, particularly when the internal combustion engine is started at a low temperature, the above configuration can improve the effects of promptly increasing the oil temperature and decreasing the oil viscosity.

Fifth Embodiment

Figure 17:
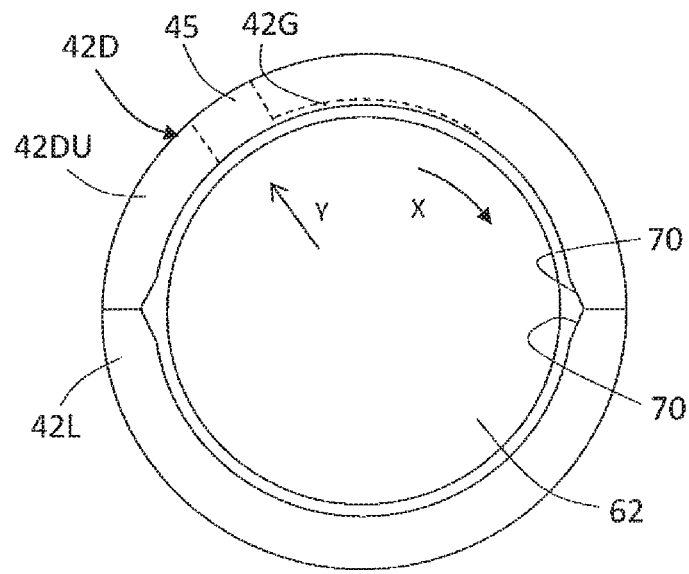
FIG. 17 is a front view of a second main bearing 42D of a fifth embodiment.
Figure 18:
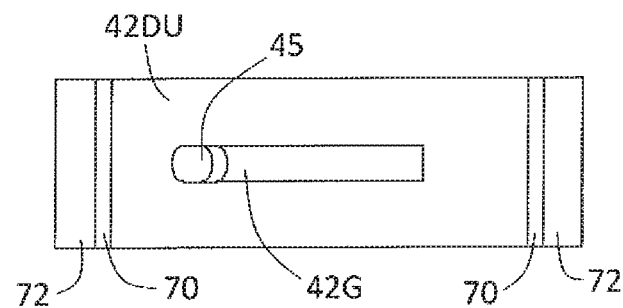
FIG. 18 is a bottom plan view of an upper half bearing 42DU illustrated in FIG. 17.
Figure 19:
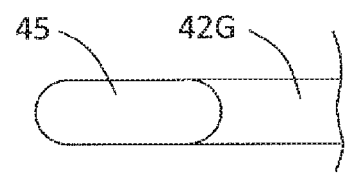
FIG. 19 is a view of an oil hole 45 along line Y in FIG. 17.

Now, with reference to FIGS. 17, 18 and 19, the description focuses on the second main bearing 42D supporting the second journal portion 62 including an upper half bearing 42DU having a different form from that of the first, second, third, and fourth embodiments. It should be noted that the same reference numerals or characters are assigned to the identical or equivalent parts described in the first embodiment in the following description.

Configuration

First, the configuration is described. The configuration of the first main bearing 41 supporting the first journal portion 61 of the present embodiment is the same as that of the first embodiment. The configuration of the second main bearing 42D is substantially the same as that of the first, second, third, and fourth embodiments except the shape of the oil hole 45 of the upper half bearing 42DU.

More specifically, as illustrated in FIG. 19 (illustrating the shape of the oil hole 45 taken along line Y in FIG. 17), the oil hole 45 of the upper half bearing 42DU of the present embodiment has an elongated hole shaped opening, whose major axis is parallel to the circumferential direction of the upper half bearing 42DU, and whose minor axis is parallel to the axial direction of the upper half bearing 42DU. The elongated hole on the major axis may be about 5 to 10 mm, and the elongated hole on the minor axis may be about 3 to 5 mm.

The configuration of the present embodiment also has the similar effects to the other embodiments.

Note that the oil hole 45 of the upper half bearing 41U of the first main bearing 41 may have the same elongated hole shape as that of the oil hole 45 of the upper half bearing 42DU.

Sixth Embodiment

Figure 20:
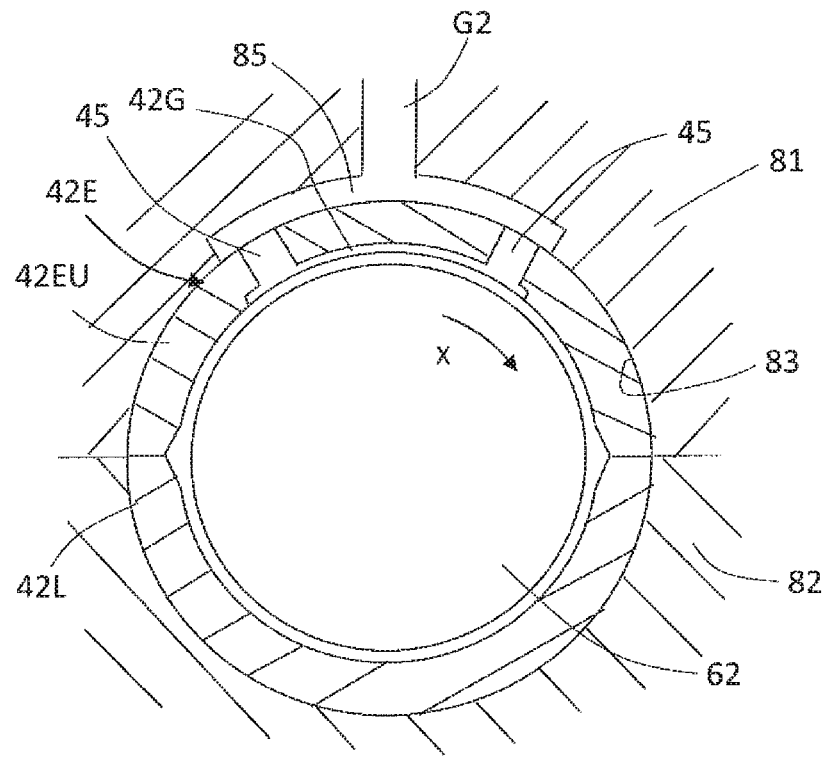
FIG. 20 is a cross-sectional view of a second main bearing 42E and a bearing housing 8 of a sixth embodiment.
Figure 21:
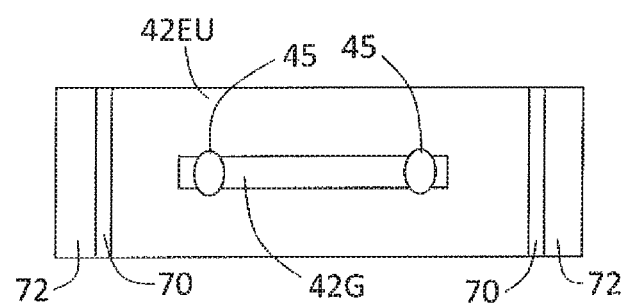
FIG. 21 is a bottom plan view of an upper half bearing 42EU illustrated in FIG. 19.

Now, with reference to FIGS. 20 and 21, the description focuses on the second main bearing 42E and the upper housing 81 supporting the second journal portion 62 including an upper half bearing 42EU having a different form from that of the first embodiment. It should be noted that the same reference numerals or characters are assigned to the identical or equivalent parts described in the first embodiment in the following description.

Configuration

First, the configuration is described. The configuration of the first main bearing 41 supporting the first journal portion 61 of the present embodiment is the same as that of the first embodiment. The configuration of the second main bearing 42E is substantially the same as that of the first, second, third, fourth, and fifth embodiments except the shape of the oil hole 45 of the upper half bearing 41EU.

More specifically, as illustrated in FIGS. 20 and 21, the half bearing 41EU of the present embodiment includes two oil holes 45 communicating with the oil groove 42G. As illustrated in FIG. 20, the semi-cylindrical surface 83a of the upper housing 81 includes a recessed portion 85 configured to communicate with an opening G2c of the internal oil passage G2 of the upper housing 81 and formed to cross the two oil holes 45 of the half bearing 42EU.

The configuration of the present embodiment also has the similar effects to the other embodiments.

Note that the number of oil holes 45 of the half bearing 42 is not limited to one or two, but may be three or more. Note also that the oil groove 42G of the upper half bearing 42 may be formed so as to communicate with at least one of a plurality of oil holes 45. Note also that the upper half bearing 41U of the first main bearing 41 supporting the first journal portion 61 may include a plurality of oil holes 45 like the upper half bearing 42U and the upper housing 81 may be configured to include the recessed portion 85 illustrated in FIG. 20.

The invention claimed is:

1. A bearing apparatus of a crankshaft for an internal combustion engine, the bearing apparatus comprising:
  a crankshaft including a plurality of journal portions and a plurality of crank pin portions;
  main bearings supporting the crankshaft; and a bearing housing holding the main bearings, wherein
  the plurality of journal portions include a first journal portion having a lubricating oil passage for supplying oil to the crank pin portions of the crankshaft and a second journal portion not having a lubricating oil passage,
  the first journal portion is supported by a first main bearing, and the first main bearing includes a pair of semi-cylindrical shaped upper half bearing and lower half bearing, and
  the second journal portion is supported by a second main bearing, and the second main bearing includes a pair of semi-cylindrical shaped upper half bearing and lower half bearing, wherein the bearing housing includes an Al alloy upper housing and an Fe alloy lower housing, the upper housing has a semi-cylindrical surface aligned with an outer peripheral surface of the upper half bearing; the lower housing has a semi-cylindrical surface aligned with an outer peripheral surface of the lower half bearing, the upper half bearings are held by the semi-cylindrical surface of the upper housing, and the lower half bearings are held by the semi-cylindrical surface of the lower housing, wherein an internal oil passage for supplying oil to the first and second main bearings is formed inside the upper housing, and an opening of the internal oil passage is formed in the semi-cylindrical surface of the upper housing, and wherein only the upper half bearings of the pairs of half bearings have oil grooves formed in the inner peripheral surface and at least one oil hole, the oil hole penetrates bearing wall thickness of the upper half bearings and opens in the outer peripheral surface, the opening of the internal oil passage of the upper housing communicates with the oil grooves through the oil hole, the upper and lower half bearings include crash reliefs at circumferential end portions of inner peripheral surfaces thereof, a range where the oil groove of the upper half bearing of the first main bearing is formed in the circumferential direction is a range where each of the circumferential end portions of the oil groove opens in a circumferential end face of the upper half bearing at a maximum distance, and communicates with the corresponding crash relief of the upper half bearing at a distance smaller than the maximum distance, a range where the oil groove of the upper half bearing of the second main bearing is formed in the circumferential direction is a range of a circumferential angle of ±45° with respect to a circumferential center portion of the upper half bearing at a maximum distance, and a range of at least a circumferential angle 10° in a region of a circumferential angle of ±45° with respect to the circumferential center portion of the upper half bearing, wherein the circumferential end portions of the oil groove of the upper half bearing of the second main bearing do not communicate with the crash reliefs, and a groove depth of the oil groove of the upper half bearing of the second main bearing is one half or less than a groove depth of the oil groove of the upper half bearing of the first main bearing.

2. The bearing apparatus of a crankshaft for an internal combustion engine according to claim 1, wherein the groove depth of the oil groove of the upper half bearing of the second main bearing is equal to or less than 0.5 mm.

3. The bearing apparatus of a crankshaft for an internal combustion engine according to claim 1, wherein the groove depth of the oil groove of the upper half bearing of the second main bearing is maximum at a center portion of a circumferential length of the oil groove and becomes smaller toward the circumferential end portions.

4. The bearing apparatus of a crankshaft for an internal combustion engine according to claim 1, wherein the at least one oil hole of the upper half bearing of the second main bearing is located at a center portion of a circumferential length of the oil groove.

5. The bearing apparatus of a crankshaft for an internal combustion engine according to claim 1, wherein the at least one oil hole of the upper half bearing of the second main bearing is located closer to a rear side in a rotation direction of the second journal portion than the center portion of a circumferential length of the oil groove.

6. The bearing apparatus of a crankshaft for an internal combustion engine according to claim 1, wherein the at least one oil hole of the upper half bearing of the second main bearing is located at an end portion on the rear side in the rotation direction of the second journal portion of the oil groove.

7. A bearing apparatus, comprising:
a crankshaft including a plurality of journal portions and a plurality of crank pin portions;
main bearings supporting the crankshaft, wherein the main bearings include a first main bearing and a second main bearing; and
a bearing housing holding the main bearings, wherein
the plurality of journal portions include a first journal portion having a lubricating oil passage for supplying oil to the crank pin portions of the crankshaft and a second journal portion having no lubricating oil passage,
the first journal portion is supported by the first main bearing, and the first main bearing includes a semi-cylindrical shaped first upper half bearing and a semi-cylindrical shaped first lower half bearing, and
the second journal portion is supported by the second main bearing, and the second main bearing includes a semi-cylindrical shaped second upper half bearing and a semi-cylindrical shaped second lower half bearing,
wherein the bearing housing includes an Al alloy upper housing and an Fe alloy lower housing,
the Al alloy upper housing has first semi-cylindrical surfaces aligned with an outer peripheral surface of the first upper half bearing and an outer peripheral surface of the second upper half bearing,
the Fe alloy lower housing has second semi-cylindrical surfaces aligned with an outer peripheral surface of the first lower half bearing and an outer peripheral surface of the second lower half bearing,
the first upper half bearing and the second upper half bearing are held by the first semi-cylindrical surface of the Al alloy upper housing, and the first lower half bearing and the second lower half bearing are held by the second semi-cylindrical surface of the Fe alloy lower housing, wherein a first internal oil passage for supplying the oil to the first main bearing and a second internal oil passage for supplying the oil to the second main bearing are formed in the Al alloy upper housing, and an opening of the first internal oil passage and an opening of the second internal oil passage are formed at the first semi-cylindrical surface of the Al alloy upper housing, and
wherein the first upper half bearing has a first oil groove and at least one first oil hole at an inner peripheral surface of the first upper half bearing, and the first lower half bearing has no oil groove and no oil hole at an inner peripheral surface of the first lower half bearing,
the second upper half bearing has a second oil groove and at least one second oil hole at an inner peripheral surface of the second upper half bearing, and the second lower half bearing has no oil groove and no oil hole at an inner peripheral surface of the second lower half bearing, the at least one first oil hole penetrates a wall of the first upper half bearing in a radial direction thereof, and has a first opening at the outer peripheral surface of the first upper half bearing,
the at least one second oil hole penetrates a wall of the second upper half bearing in a radial direction thereof, and has a second opening at the outer peripheral surface of the second upper half bearing, the opening of the first internal oil passage communicates with the first oil groove through the at least one first oil hole and the opening of the second internal oil passage communicates with the second oil groove through the at least one second oil hole, each of the first upper half bearing, the first lower half bearing, the second upper half bearing, and the second lower half bearing includes a corresponding crash relief at a circumferential end portion of the inner peripheral surface thereof, the first oil groove is formed, in a circumferential direction of the first upper half bearing, in a range where circumferential end portions of the first oil groove open at circumferential end faces of the upper half bearing at a maximum distance, and communicate with the corresponding crash relief of the first upper half bearing at a distance smaller than the maximum distance, the second oil groove is formed, in a circumferential direction of the second upper half bearing, in a range of a circumferential angle of ±45° with respect to a circumferential center portion of the second upper half bearing at a maximum, and at least a circumferential angle 10° in a region of the circumferential angle of ±45° with respect to the circumferential center portion of the second upper half bearing at a distance smaller than the maximum distance, wherein the circumferential end portions of the second oil groove do not communicate with the corresponding crash relief, and a groove depth of the second oil groove is one half or less than a groove depth of the first oil groove.

\* \* \* \* \*